(12) United States Patent
Schlag

(10) Patent No.: US 7,870,971 B2
(45) Date of Patent: Jan. 18, 2011

(54) DIFFUSION LAYER FOR PRESSURE VESSELS

(75) Inventor: Harald Schlag, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 738 days.

(21) Appl. No.: 11/847,007

(22) Filed: Aug. 29, 2007

(65) Prior Publication Data

US 2009/0057319 A1    Mar. 5, 2009

(51) Int. Cl.
*F17C 1/02*    (2006.01)
(52) U.S. Cl. .................................... 220/585; 220/586
(58) Field of Classification Search ............... 220/585, 220/582, 589, 601, 581, 586, 587; 138/30
See application file for complete search history.

(56) References Cited

U.S. PATENT DOCUMENTS

| | | | |
|---|---|---|---|
| 3,368,586 A * | 2/1968 | French et al. ............... | 138/30 |
| 4,080,996 A * | 3/1978 | Zahid ......................... | 138/30 |
| 4,344,458 A * | 8/1982 | Zahid ......................... | 138/30 |
| 6,787,007 B2 * | 9/2004 | Lessing ....................... | 204/242 |
| 2005/0194054 A1 * | 9/2005 | Moskalik et al. ............. | 138/31 |

FOREIGN PATENT DOCUMENTS

DE    1255684    * 12/1967

\* cited by examiner

*Primary Examiner*—Stephen Castellano
(74) *Attorney, Agent, or Firm*—Fraser Clemens Martin & Miller LLC; J. Douglas Miller

(57) ABSTRACT

Disclosed is a vessel and a method of forming the vessel including an inner shell, an outer shell, and a diffusion layer disposed therebetween, wherein the diffusion layer facilitates the venting of a fluid from between the inner shell and the outer shell.

18 Claims, 4 Drawing Sheets

DIFFUSION LAYER FOR PRESSURE VESSELS

FIELD OF THE INVENTION

The invention relates to a hollow vessel and more particularly to a method and apparatus for forming a hollow pressure vessel having an inner shell, an outer shell, and a diffusion layer disposed therebetween, wherein the diffusion layer facilitates a venting of a fluid that has penetrated the inner shell.

BACKGROUND OF THE INVENTION

Fuel cells have been proposed as a power source for electric vehicles and other applications. In proton exchange membrane (PEM) type fuel cells, hydrogen is supplied as a fuel to an anode of the fuel cell and oxygen is supplied as an oxidant to a cathode of the fuel cell. A plurality of fuel cells is stacked together in fuel cell stacks to form a fuel cell system. The fuel and oxidant are typically stored in large pressurized hollow vessels, such as fuel tanks, disposed on an undercarriage of the vehicle.

The pressurized vessels may be multi-layered and include at least an inner shell and an outer shell. Some inner shells are manufactured using a rotational molding method. The inner shell is formed utilizing the rotational molding method by disposing bosses in a die cavity with a polymer resin, heating the mold while it is rotated causing the resin to melt and coat walls of the die cavity, cooling the die, and removing the molded inner shell. To form the outer shell, the molded inner shell may undergo a filament winding process. The filament winding process often results in the creation of a space between the outer shell and the inner shell of the fuel tank. Gas that diffuses through the inner shell creates gas pockets between the inner shell and the outer shell.

It would be desirable to develop a hollow pressure vessel and method of forming the same having an inner shell, an outer shell, and a diffusion layer disposed therebetween, wherein the diffusion layer facilitates a venting of a fluid that has diffused through the inner shell.

SUMMARY OF THE INVENTION

Concordant and congruous with the present invention, a hollow pressure vessel and method of forming the same having an inner shell, an outer shell, and a diffusion layer disposed therebetween, wherein the diffusion layer facilitates a venting of a fluid that has diffused through the inner shell, has surprising been discovered.

In one embodiment, the method of forming a vessel comprises the steps of providing a boss; forming a hollow inner shell from a moldable material, wherein the inner shell is formed in contact with the boss; forming a diffusion layer on at least a portion of the inner shell; and forming an outer shell over the diffusion layer and the inner shell.

In another embodiment, the vessel comprises a hollow inner shell formed from a moldable material and adapted to store a fluid; a boss adhered to the moldable material of said inner shell and forming a substantially fluid tight seal therebetween; a diffusion layer formed around at least a portion of said inner shell, wherein said diffusion layer facilitates the flow of a fluid from the diffusion layer to an exterior of said vessel; and an outer shell formed around said diffusion layer and said inner shell.

In another embodiment, the vessel comprises a hollow inner shell formed from a moldable material and adapted to store a fluid; a boss adhered to the moldable material of said inner shell and forming a substantially fluid tight seal therebetween, wherein said boss includes a flow channel formed therein in fluid communication with an exterior of said vessel and the diffusion layer; a diffusion layer formed around at least part of said inner shell, wherein said diffusion layer facilitates the flow of a fluid from the diffusion layer, through said boss, and to the exterior of said vessel; and an outer shell formed around said diffusion layer and said inner shell.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
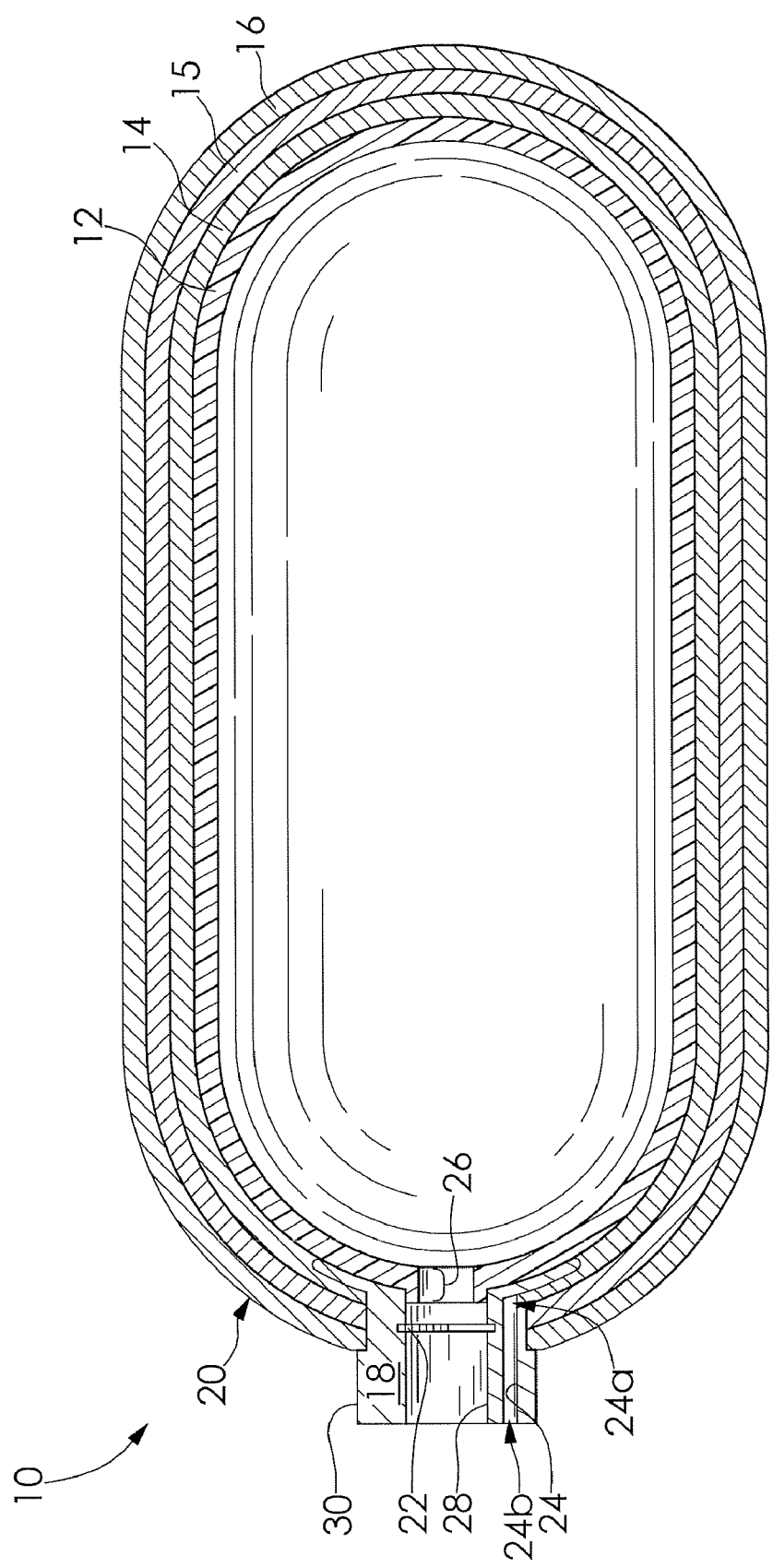
FIG. 1 is a cross-sectional view of a vessel according to an embodiment of the invention.

FIG. 1 illustrates a hollow pressure vessel 10 having an inner shell 12, a diffusion layer 14, and an outer shell 16. The vessel 10 has a substantially cylindrical shape and is adapted to hold a pressurized fluid (not shown). It is understood that the vessel 10 may have any shape as desired. The pressurized fluid may be any fluid such as a gas such as hydrogen gas and oxygen gas, a liquid, and both a liquid and a gas, for example.

Figure 4:
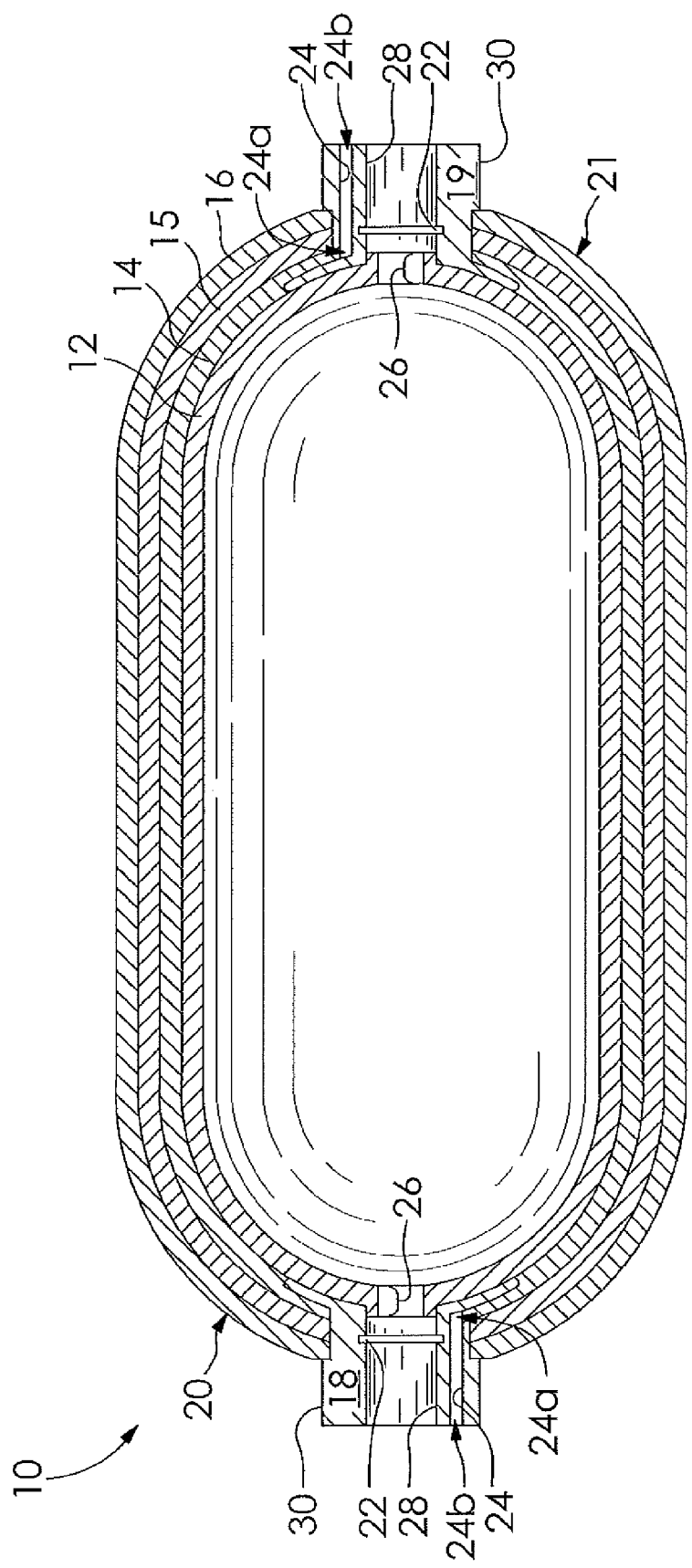
FIG. 4 is a cross-sectional view of a vessel according to another embodiment of the invention.

The vessel 10 includes a boss 18 disposed on a first end 20 thereof. The boss 18 is a separately produced finish that forms an opening into an interior of the vessel 10, and is typically shaped to accommodate a specific closure. The vessel 10 may include any number of bosses, as desired. The boss 18 includes an annular groove 22 formed on an inner surface 28 and a flow channel 24 formed therein. The groove 22 is adapted to receive a portion of a hose, nozzle, conduit, or other means for fluid communication (not shown) with the boss 18 and the interior of the vessel 10. Rather than the groove 22, the inner surface 28 of the boss 18 may be threaded to receive the various means for fluid communication. The flow channel 24 is formed in a sidewall of the boss 18. An opening 24a of the flow channel 24 is in fluid communication with the diffusion layer 14, and an opening 24b of the flow channel 24 is in fluid communication with an exterior of the vessel 10. The opening 24b may also be in fluid communication with the atmosphere or a ventilation system, as desired. It is also understood that the boss 18 may be formed from any conventional material such as a plastic, steel, a steel alloy, or aluminum, for example. As shown in FIG. 4, the vessel 10 may include a second boss 19 substantially identical to the boss 18 disposed on a second end 21 thereof, as desired.

The inner shell 12 of the vessel 10 is a hollow container adapted to store the pressurized fluid. As shown, the inner shell 12 has a substantially cylindrical shape. However, the inner shell 12 may have any shape, as desired. A first end of the inner shell 12 is received in an aperture formed by the inner surface 28 of the boss 18 at the first end 20 of the vessel

10. The inner shell 12 may also be received on an outer surface 30 of the boss 18, as desired. As shown, the inner shell 12 is formed from a plastic such as polyethylene, PET, ethylene vinyl alcohol, or an ethylene vinyl acetate terpolymer, for example. The inner shell 12 may also be formed from any moldable material such as a metal, a glass, and the like, as desired.

The diffusion layer 14 is disposed between the inner shell 12 and the outer shell 16 of the vessel 10. The diffusion layer 14 is formed around the inner shell 12 of the vessel 10 and is in communication with the opening 24a of the flow channel 24 of the boss 18. As shown in FIG. 1, the diffusion layer 14 is formed from carbon fibers filament wound around the inner shell 12. It is understood that that the diffusion layer 14 may be formed from any fluid permeable material adapted to facilitate the diffusion of a fluid such as a foam, a carbon paper, a resin coated carbon fiber, a glass fiber, and the like, for example.

The outer shell 16 of the vessel 10 is disposed on the diffusion layer 14 and has a substantially cylindrical shape. As shown, the outer shell 16 substantially abuts the diffusion layer 14. The outer shell 16 is disposed on the boss 18 at the first end 20 of the vessel 10. The outer shell 16 may be formed from any moldable material such as a metal and a plastic, for example, or the outer shell 16 may be formed with a filament winding process. If the outer shell 16 is formed by a filament winding process, the outer shell 16 may be formed from a carbon fiber, a glass fiber, a composite fiber, and a fiber having a resin coating, as desired. It is understood that the material used to form the outer shell 16 may be selected based on the process used to affix the outer shell 16 to the diffusion layer 14 and the inner shell 12, the use of the vessel 10, and the properties of the fluid to be stored in the vessel 10.

To form the vessel 10, the inner shell 12 is typically formed using a blow molding process. The boss 18 is disposed in a die (not shown) and the die is then closed. The boss 18 may be heated prior to being disposed in the die to facilitate adhesion to the inner shell 12 as it is formed. Melted pellets or flakes of plastic are then extruded into the die in the form of a parison (not shown). Because the parison is continuously extruded into the die, the parison is hollow. A fluid (not shown) is then caused to flow through the parison in the die causing the parison to expand and contact the walls of the die, thereby taking the shape of the die cavity. The inner shell 12 may be formed from other conventional processes such as rotational molding, for example, as desired. It is understood that the fluid may be any conventional fluid such as air, nitrogen, hydrogen, or oxygen, as desired. As the parison is expanded by the fluid, a portion of the parison is caused to contact, adhere to, and form a substantially fluid tight seal with the boss 18.

As shown in FIG. 1, a neck portion 26 of the material forming the parison is blow molded into the inner surface 28 of the boss 18. Material may be blown into the groove 22 and on the inner surface 28, and may be cut away or otherwise machined from the boss 18, as desired. It is understood that the surfaces of the boss 18 that contact the moldable material during the blow molding process may be etched, coated with a primer, or coated with an adhesive prior to the blow molding process to facilitate adhesion of the boss 18 to the moldable material, as desired. It is also understood that the boss 18 may include grooves, cavities, channels, or protuberances adapted to receive a portion of the material to mechanically attach the material to the boss 18. Once the blow molded material has cooled sufficiently, the die is opened and the inner shell 12 is removed.

The diffusion layer 14 is typically formed around the inner shell 12 with a filament winding process. The inner shell 12 may be disposed over a mandrel (not shown) or disposed in an automated filament winding apparatus (not shown) and rotated as the diffusion layer 14 is applied to the inner shell 12 and a portion of the boss 18. A first layer of the carbon fibers or other material used to form the diffusion layer 14 is wound around the inner shell 12. The first layer of the carbon fibers is coated with a minimal amount of resin to fix the carbon fibers to the inner shell 12. Another layer of carbon fibers is typically applied perpendicularly over the first layer of carbon fibers to complete the diffusion layer 14. Depending on a rate of diffusion of the pressurized fluid through the inner shell 12, the diffusion layer 14 may be comprised of numerous layers of carbon fibers or as little as a single layer of carbon fiber. Other methods can be used to form the diffusion layer 14 as desired.

Carbon fibers heavily impregnated with the resin are typically filament wound around the diffusion layer 14 to form the outer shell 16. The carbon fibers of the outer shell 16 heavily impregnated with resin are applied to form a substantially fluid tight resin seal over the diffusion layer 14 and the inner shell 12. To militate against the penetration of the resin from the heavily impregnated carbon fibers into the diffusion layer 14 a protective layer 15 may be placed onto the diffusion layer 14. As shown, the protective layer 15 is a foil, however, the protective layer 15 may be a plastic, a cloth, or another material, as desired. It is understood that the outer shell 16 may be applied by a dipping process in a molten polymer or metal, by spraying a coating, or by sewing a leather or fabric material onto the diffusion layer 14 and inner shell 12. Once the outer shell 16 is applied, the vessel 10 may be placed in an autoclave (not shown) to allow the resin of the outer shell 16 to cure. Once the resin of the outer shell 16 is cured, the vessel 10 is complete. Due to the resin tight seal of the outer shell 16 over the diffusion layer 14 and because of the winding pattern of the diffusion layer 14, flow paths (not shown) in fluid communication with the opening 24a of the boss 18 are formed in the diffusion layer 14.

During use of the vessel 10, fluid contained in the vessel 10 diffuses through the inner shell 12 and into the diffusion layer 14. The fluid then flows through the flow paths formed in the diffusion layer 14, to the opening 24a of the flow path 24 of the boss 18, through the boss 18, and out into the atmosphere, thereby militating against a pressure and parasitic fluid cushion build-up between the inner shell 12 and outer shell 16 and extending a useful life of the vessel 10.

Figure 2:
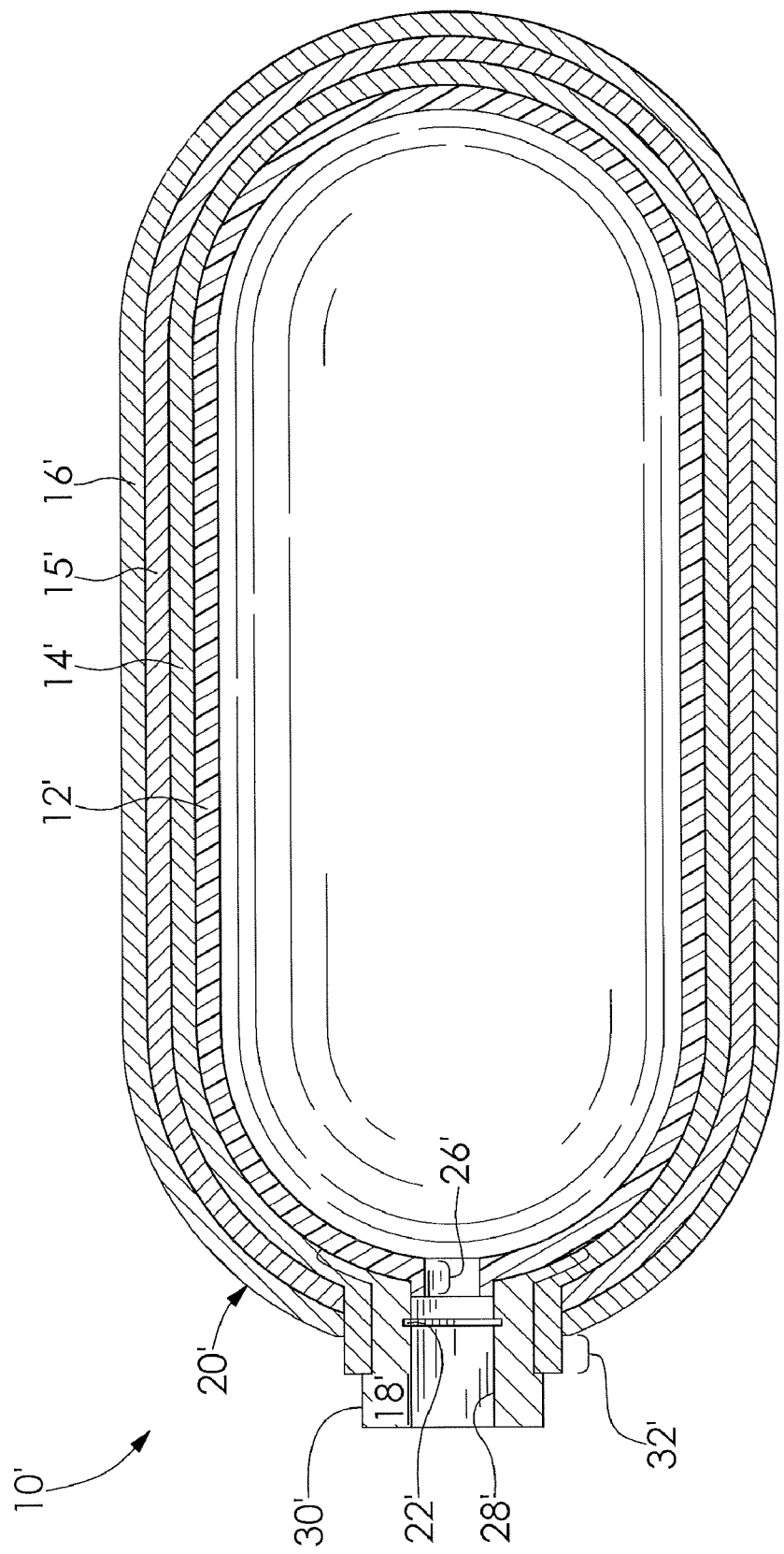
FIG. 2 is a cross-sectional view of a vessel according to another embodiment of the invention.

FIG. 2 shows a hollow pressure vessel 10' according to another embodiment of the invention. The embodiment of FIG. 2 is similar to the vessel 10 of FIG. 1, except as described below. Similar to the structure of FIG. 1, FIG. 2 includes the same reference numerals accompanied by a prime (') to denote similar structure.

FIG. 2 illustrates the hollow pressure vessel 10' having an inner shell 12', a diffusion layer 14', and an outer shell 16'. The vessel 10' has a substantially cylindrical shape and is adapted to hold a pressurized fluid (not shown). It is understood that the vessel 10' may have any shape as desired. The pressurized fluid may be any fluid such as a gas such as hydrogen gas and oxygen gas, a liquid, and both a liquid and a gas, for example.

The vessel 10' includes a boss 18' disposed on a first end 20' thereof. The boss 18' is a separately produced finish that forms an opening into an interior of the vessel 10', and is typically shaped to accommodate a specific closure. The vessel 10' may include any number of bosses, as desired. The boss 18' includes an annular groove 22' formed on an inner surface 28' therein. The groove 22' is adapted to receive a portion of a hose, nozzle, conduit, or other means for fluid communication (not shown) with the boss 18' and the interior of the vessel 10'. Rather than the groove 22', the inner surface 28' of the boss 18' may be threaded to receive the various means for fluid communication. It is understood that the boss 18' may be formed from any conventional material such as a plastic, steel, a steel alloy, or aluminum, for example.

The inner shell 12' of the vessel 10' is adapted to store the pressurized fluid. As shown, the inner shell 12' has a substantially cylindrical shape. However, the inner shell 12' may have any shape, as desired. A first end of the inner shell 12' is received in an aperture formed by the inner surface 28' of the boss 18' at the first end 20' of the vessel 10'. The inner shell 12' may also be received on an outer surface 30' of the boss 18', as desired. As shown, the inner shell 12' is formed from a plastic such as polyethylene, PET, ethylene vinyl alcohol, or an ethylene vinyl acetate terpolymer, for example. The inner shell 12' may also be formed from any moldable material such as a metal, a glass, and the like, as desired.

The diffusion layer 14' is disposed between the inner shell 12' and the outer shell 16' of the vessel 10'. The diffusion layer 14' is formed around the inner shell 12' of the vessel 10' and is in communication with the outer surface 30' of the boss 18'. As shown in FIG. 2, the diffusion layer 14' is formed from carbon fibers filament wound around the inner shell 12'. It is understood that that the diffusion layer 14' may be formed from any fluid permeable material adapted to facilitate the diffusion of a fluid such as a foam, a carbon paper, a glass fiber, and the like for example.

The outer shell 16' of the vessel 10' is disposed on the diffusion layer 14' and has a substantially cylindrical shape. As shown, the outer shell 16' substantially abuts the diffusion layer 14'. The outer shell 16' is disposed on the boss 18' at the first end 20' of the vessel 10'. The outer shell 16' may be formed from any moldable material such as a metal, and a plastic, for example, or the outer shell 16' may be formed with a filament winding process. If the outer shell 16' is formed by a filament winding process, the outer shell 16' may be formed from a carbon fiber, a glass fiber, a composite fiber, and a fiber having a resin coating, as desired. It is understood that the material used to form the outer shell 16' may be selected based on the process used to affix the outer shell 16' to the diffusion layer 14' and the inner shell 12', the use of the vessel 10', and the properties of the fluid to be stored in the vessel 10'.

To form the vessel 10', the inner shell 12' is typically formed using a blow molding process. The boss 18' is disposed in a die (not shown) and the die is then closed. The boss 18' may be heated prior to being disposed in the die to facilitate adhesion to the inner shell 12' as it is formed. Melted pellets or flakes of plastic are then extruded into the die in the form of a parison (not shown). Because the parison is continuously extruded into the die, the parison is hollow. A fluid (not shown) is then caused to flow through the parison in the die causing the parison to expand and contact the walls of the die, thereby taking the shape of the die cavity. The inner shell 12' may be formed from other conventional processes such as rotational molding, for example, as desired. It is understood that the fluid may be any conventional fluid such as air, nitrogen, hydrogen, or oxygen, as desired. As the parison is expanded by the fluid, a neck portion 26' of the parison is caused to contact, adhere to, and form a substantially fluid tight seal with the boss 18'.

As shown in FIG. 2, the neck portion 26' of the material forming the parison is blow molded into the inner surface 28' of the boss 18'. Material may be blown into the groove 22' and on the inner surface 28', and may be cut away or otherwise machined from the boss 18', as desired. It is understood that the surfaces of the boss 18' that contact the moldable material during the blow molding process may be etched, coated with a primer, or coated with an adhesive prior to the blow molding process to facilitate adhesion of the boss 18' to the moldable material, as desired. It is also understood that the boss 18' may include grooves, cavities, channels, or protuberances adapted to receive a portion of the material to mechanically attach the material to the boss 18'. Once the blow molded material has cooled sufficiently, the die is opened and the inner shell 12' is removed.

The diffusion layer 14' is typically formed around the outside of the inner shell 12' and the outer surface 30' of the boss 18' with a filament winding process. The inner shell 12' may be disposed over a mandrel (not shown) or disposed in an automated filament winding apparatus (not shown) and rotated as the diffusion layer 14' is applied to the inner shell 12' and a portion of the boss 18'. A first layer of the carbon fibers or other material used to form the diffusion layer 14' is wound around the inner shell 12'. The first layer of the carbon fibers is coated with a minimal amount of resin to fix the carbon fibers to the inner shell 12'. Another layer of carbon fibers is typically applied perpendicularly over the first layer of carbon fibers to complete the diffusion layer 14'. Depending on the rate of diffusion of the pressurized fluid through the inner shell 12', the diffusion layer 14' may be comprised of numerous layers of carbon fibers or as little as a single layer of carbon fiber. Other methods can be used to form the diffusion later 14' as desired.

Carbon fibers heavily impregnated with the resin are filament wound around the diffusion layer 14' to form the outer shell 16'. A portion 32' of the diffusion layer 14' is not contacted by carbon fibers of the outer shell 16'. The carbon fibers of the outer shell 16' heavily impregnated with resin are applied to form a substantially fluid tight resin seal over the diffusion layer 14' and the inner shell 12'. To militate against the penetration of the resin from the heavily impregnated carbon fibers into the diffusion layer 14', a protective layer 15' may be placed onto the diffusion layer 14'. As shown, the protective layer 15' is a foil, however, the protective layer 15' may be a plastic, a cloth, or another material, as desired. It is understood that the outer shell 16' may be applied by a dipping process in a molten polymer or metal, by spraying a coating, or by sewing a leather or fabric material onto the diffusion layer 14' and inner shell 12'. Once the outer shell 16 is applied, the vessel 10' may be placed in an autoclave (not shown) to allow the resin of the outer shell 16' to cure. Once the resin of the outer shell 16' is cured, the vessel 10' is complete. Due to the resin tight seal of the outer shell 16' over the diffusion layer 14' and because of the winding pattern of the diffusion layer 14', flow paths (not shown) in fluid communication with the exterior of the vessel 10' are formed in the diffusion layer 14'.

During use of the vessel 10', fluid contained in the vessel 10' diffuses through the inner shell 12' and into the diffusion layer 14'. The fluid then flows through the flow paths formed in the diffusion layer 14' and out into the atmosphere, thereby militating against a pressure and parasitic fluid cushion build-up between the inner shell 12' and outer shell 16' and extending a useful life of the vessel 10'.

Figure 3:
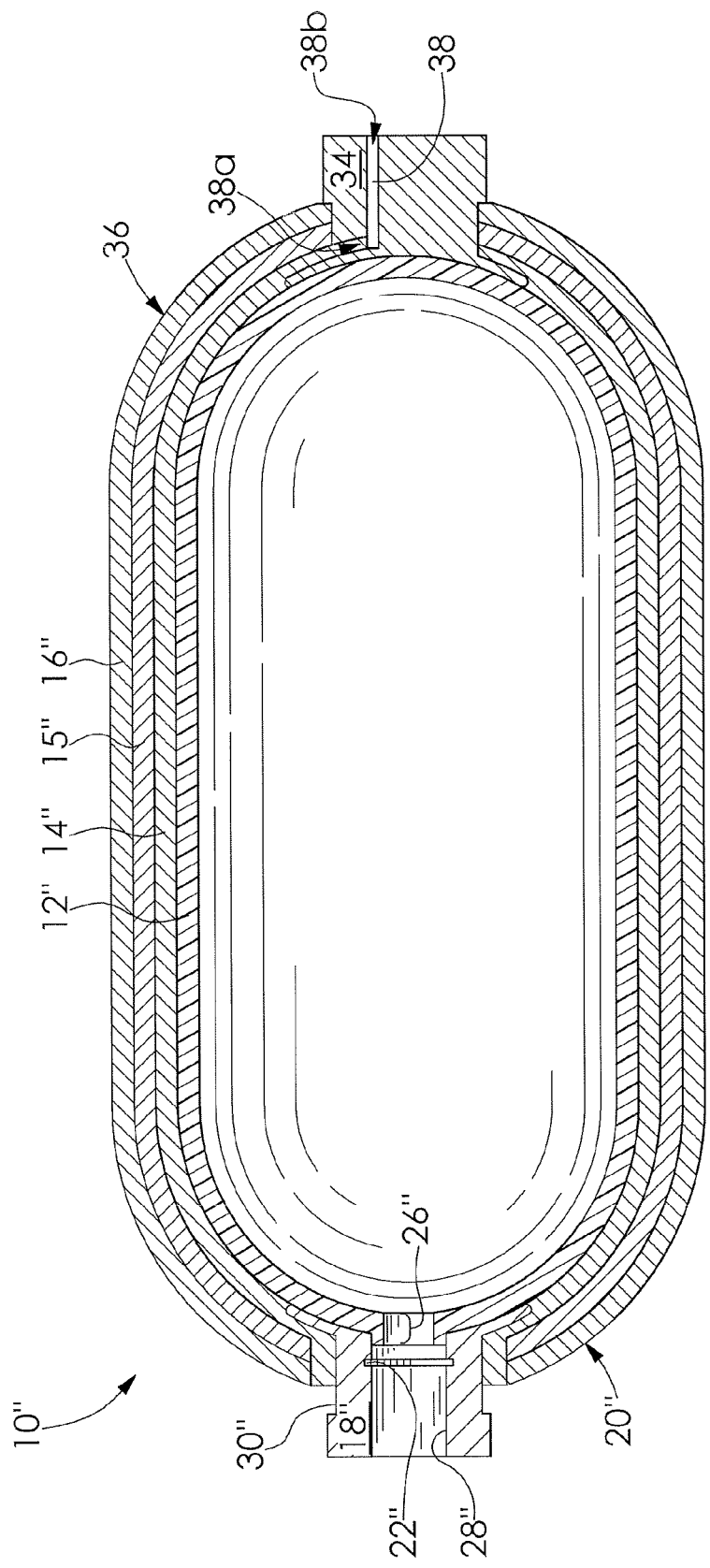
FIG. 3 is a cross-sectional view of a vessel according to another embodiment of the invention.

FIG. 3 shows a hollow pressure vessel 10" according to another embodiment of the invention. The embodiment of FIG. 3 is similar to the vessel 10 of FIG. 1, except as described below. Similar to the structure of FIG. 1, FIG. 3 includes the same reference numerals accompanied by a double-prime (") to denote similar structure.

FIG. 3 illustrates the hollow pressure vessel 10" having an inner shell 12", a diffusion layer 14", and an outer shell 16". The vessel 10" has a substantially cylindrical shape and is adapted to hold a pressurized fluid (not shown). It is understood that the vessel 10" may have any shape as desired. The pressurized fluid may be any fluid such as a gas such as hydrogen gas and oxygen gas, a liquid, and both a liquid and a gas, for example.

The vessel 10" includes a boss 18" disposed on a first end 20" the vessel 10" and a blind boss 34 disposed on a second end 36 of the vessel 10". The boss 18" is a separately produced finish that forms an opening into an interior of the vessel 10'", and is shaped to accommodate a specific closure. The vessel 10'" may include any number of bosses, as desired. The boss 18" includes an annular groove 22". The groove 22" is adapted to receive a portion of a hose, nozzle, conduit, or other means for fluid communication (not shown) with the boss 18" and the interior of the vessel 10". Rather than the groove 22", the inner surface 28" of the boss 18" may be threaded to receive the various means for fluid communication. The blind boss 34 is a separately produced and outwardly projecting closed hole fixed to the vessel 10"'. A blind boss typically includes threads adapted to receive the threaded portion of another vessel, pump, or motor to anchor another vessel, pump, or motor to the vessel. The blind boss 34 includes a flow channel 38 formed therein. The flow channel 38 is formed in a sidewall of the blind boss 34. An opening 38a of the fluid channel 38 is in fluid communication with the diffusion layer 14", and an opening 38b of the flow channel 38 is in fluid communication with an exterior of the vessel 10"'. The opening 38b may also be in fluid communication to the atmosphere or a ventilation system, as desired. It is understood that the blind boss 34 may formed from any conventional material such as a plastic, steel, a steel alloy, or aluminum, for example.

The inner shell 12" of the vessel 10" is a hollow container adapted to store the pressurized fluid. As shown, the inner shell 12" has a substantially cylindrical shape. However, the inner shell 12" may have any shape, as desired. A first end of the inner shell 12" is received in an aperture formed by the inner surface 28" of the boss 18" at the first end 20" of the vessel 100". The inner shell 12" may also be received on an outer surface 30" of the boss 18", as desired. As shown, the inner shell 12" is formed from a plastic such as polyethylene, PET, ethylene vinyl alcohol, or an ethylene vinyl acetate terpolymer, for example. The inner shell 12" may be formed from any moldable material such as a metal, a glass, and the like, as desired.

The diffusion layer 14" is disposed between the inner shell 12" and the outer shell 16" of the vessel 10". The diffusion layer 14" is formed around the inner shell 12" of the vessel 10" and is in communication with the opening 38a of the flow channel 38 of the boss 18". As shown in FIG. 3, the diffusion layer 14" is formed from carbon fibers filament wound around the inner shell 12". It is understood that that the diffusion layer 14" may be formed from any fluid permeable material adapted to facilitate the diffusion of a fluid, such as a foam, a carbon paper, a glass fiber, and the like, for example.

The outer shell 16" of the vessel 10" is disposed on the diffusion layer 14" and has a substantially cylindrical shape. As shown, the outer shell 16" substantially abuts the diffusion layer 14". The outer shell 16" is disposed on the boss 18" at the first end 20" of the vessel 10". The outer shell 16" may be formed from any moldable material such as a metal and a plastic, for example, or the outer shell 16" may be formed with a filament winding process. If the outer shell 16" is formed by a filament winding process, the outer shell 16 may be formed from a carbon fiber, a glass fiber, a composite fiber, and a fiber having a resin coating, as desired. It is understood that the material used to form the outer shell 16" may be selected based on the process used to affix the outer shell 16" to the diffusion layer 14" and the inner shell 12", the use of the vessel 10", and the properties of the fluid to be stored in the vessel 10".

To form the vessel 10", the inner shell 12" is typically formed using a blow molding process. The boss 18" and blind boss 34 are disposed in a die (not shown) and the die is closed. The boss 18" and blind boss 34 may be heated prior to being disposed in the die to facilitate adhesion to the inner shell 12" as it is formed. Melted pellets or flakes of plastic are then extruded into the die in the form of a parison (not shown). Because the parison is continuously extruded into the die, the parison is hollow. A fluid (not shown) is then caused to flow through the parison in the die causing the parison to expand and contact the walls of the die, thereby taking the shape of the die cavity. The inner shell 12" may be formed from other conventional processes such as rotational molding, for example, as desired. It is understood that the fluid may be any conventional fluid such as air, nitrogen, hydrogen, or oxygen, as desired. As the parison is expanded by the fluid, a neck portion 26" of the parison is caused to contact, adhere to, and form a substantially fluid tight seal with the boss 18".

As shown in FIG. 3, the neck portion 26" of the material forming the parison is blow molded into the inner surface 28" of the boss 18" and against the blind boss 34. Material may be blown into the groove 22" and on the inner surface 28", and may be cut away or otherwise machined from the boss 18", as desired. It is understood that the surfaces of the boss 18" that contact the moldable material during the blow molding process may be etched, coated with a primer, or coated with an adhesive prior to the blow molding process to facilitate adhesion of the boss 18" to the moldable material, as desired. It is also understood that the boss 18" may include grooves, cavities, channels, or protuberances adapted to receive a portion of the material to mechanically attach the material to the boss 18". Once the blow molded material has cooled sufficiently, the die is opened and the inner shell 12" is removed.

The diffusion layer 14" is typically formed around the inner shell 12" with a filament winding process. The inner shell 12" may be disposed over a mandrel (not shown) or disposed in an automated filament winding apparatus (not shown) and rotated as the diffusion layer 14" is applied to the inner shell 12" and a portion of the boss 18". A first layer of the carbon fibers or other material used to form the diffusion layer 14" is wound around the inner shell 12". The first layer of the carbon fibers is coated with a minimal amount of resin to fix the carbon fibers to the inner shell 12". Another layer of carbon fibers is typically applied perpendicularly over the first layer of carbon fibers to complete the diffusion layer 14". Depending on the rate of diffusion of the pressurized fluid through the inner shell 12", the diffusion layer 14" may be comprised of numerous layers of carbon fibers or as little as a single layer of carbon fiber. Other methods can be used to form the diffusion later 14" as desired.

Carbon fibers heavily impregnated with the resin are filament wound around the diffusion layer 14" to form the outer shell 16". The carbon fibers of the outer shell 16" heavily impregnated with resin are applied to form a substantially fluid tight resin seal over the diffusion layer 14" and the inner shell 12". To militate against the penetration of the resin from the heavily impregnated carbon fibers penetrates into the diffusion layer 14" a protective layer 15" may be placed onto the diffusion layer 14". As shown, the protective layer 15" is a foil, however, the protective layer 15" may be a plastic, a cloth, or another material, as desired. It is understood that the outer shell 16" may be applied by a dipping process in a molten polymer or metal, by spraying a coating, or by sewing a leather or fabric material onto the diffusion layer 14" and inner shell 12". Once the outer shell 16" is applied, the vessel 10" may be placed in an autoclave (not shown) to allow the resin of the outer shell 16 to cure. Once the resin of the outer shell 16" is cured, the vessel 10" is complete. Due to the resin tight seal of the outer shell 16" over the diffusion layer 14" and because of the winding pattern of the diffusion layer 14", flow paths (not shown) in fluid communication with the opening 38a of the blind boss 34 are formed in the diffusion layer 14".

During use of the vessel 10", fluid contained in the vessel 10" diffuses through the inner shell 12" and into the diffusion layer 14". The fluid then flows through the flow paths formed in the diffusion layer 14", to the opening 38a of the flow path 38 of the boss 18", through the boss 18", and out into the atmosphere, thereby militating against a pressure and parasitic fluid cushion build-up between the inner shell 12" and outer shell 16" and extending a useful life of the vessel 10".

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A vessel comprising:
   a hollow inner shell formed from a moldable material and adapted to store a fluid;
   a boss adhered to the moldable material of said inner shell and forming a substantially fluid tight seal therebetween;
   a diffusion layer formed around substantially all of said inner shell, wherein said diffusion layer facilitates the flow of a fluid from the diffusion layer to an exterior of said vessel; and
   an outer shell formed around said diffusion layer and said inner shell.

2. The vessel of claim 1, wherein said outer shell and said diffusion layer are formed by a filament winding process.

3. The vessel of claim 1, wherein the outer shell form is formed from a carbon fiber having a resin coating to form a resin-tight seal around said diffusion layer and said inner shell.

4. The vessel of claim 1, wherein said boss includes a flow channel in fluid communication with the exterior of the vessel and the diffusion layer.

5. The vessel of claim 1, further including a blind boss adhered to the moldable material of said inner shell and forming a substantially fluid tight seal therebetween, wherein said blind boss includes a flow channel formed therein providing fluid communication between the atmosphere and the diffusion layer.

6. The vessel of claim 1, wherein said diffusion layer is in direct fluid communication with the exterior of said vessel.

7. A method of forming a vessel comprising the steps of:
   providing a boss;
   forming a hollow inner shell from a moldable material, wherein the inner shell is formed in contact with the boss;
   forming a diffusion layer on at least a portion of the inner shell, the diffusion layer in direct fluid communication with the atmosphere; and
   forming an outer shell over the diffusion layer providing a blind boss formed with the inner shell, wherein the blind boss includes a flow channel formed therein providing fluid communication between the diffusion layer and the atmosphere; and the inner shell.

8. The method of claim 7, further including the step of providing a protective layer between the diffusion layer and the outer shell to militate against the penetration of the outer shell into the diffusion layer.

9. The method of claim 7, wherein the inner shell is formed by one of a blow molding process and a rotational molding process.

10. The method of claim 7, wherein the diffusion layer is formed by a filament winding process.

11. The method of claim 7, wherein the outer shell is formed by a filament winding process.

12. The method of claim 7, wherein the diffusion layer and outer shell are formed from one of a carbon fiber, a carbon fiber composite, a glass fiber, and a fiber having a resin coating.

13. The method of claim 7, wherein the boss includes a flow channel providing fluid communication between the diffusion layer and the atmosphere.

14. The method of claim 7, further including the step of providing a second boss formed with the inner shell, wherein the second boss includes a flow channel formed therein providing fluid communication between the diffusion layer and the atmosphere.

15. The method of claim 7, wherein the diffusion layer is formed on substantially all of the inner shell.

16. A vessel comprising:
   a hollow inner shell formed from a moldable material and adapted to store a fluid;
   a diffusion layer formed around at least part of said inner shell, wherein said diffusion layer facilitates a flow of a fluid from said diffusion layer to an exterior of said vessel;
   a boss adhered to the moldable material of said inner shell and forming a substantially fluid tight seal therebetween, wherein said boss includes a flow channel formed therein providing fluid communication between the exterior of said vessel and said diffusion layer;
   a blind boss adhered to the moldable material of said inner shell and forming a substantially fluid tight seal therebetween, wherein said blind boss includes a flow channel formed therein providing fluid communication between the exterior of said vessel and the diffusion layer; and
   an outer shell formed around said diffusion layer and said inner shell.

17. The vessel of claim 16, wherein said outer shell and said diffusion layer are formed by a filament winding process.

18. A vessel comprising:
   a hollow inner shell formed from a moldable material and adapted to store a fluid;
   a diffusion layer formed around at least part of said inner shell, wherein said diffusion layer facilitates the flow of a fluid from said diffusion layer to an exterior of said vessel;
   a boss adhered to the moldable material of said inner shell and forming a substantially fluid tight seal therebetween, wherein said boss includes a flow channel formed therein providing fluid communication between the exterior of said vessel and said diffusion layer;
   a second boss adhered to the moldable material of said inner shell and forming a substantially fluid tight seal therebetween, wherein said second boss includes a flow channel formed therein providing fluid communication between the exterior of said vessel and the diffusion layer; and
   an outer shell formed around said diffusion layer and said inner shell.

* * * * *